United States Patent [19]

Koike et al.

[11] Patent Number: 4,862,004
[45] Date of Patent: Aug. 29, 1989

[54] RADIATION DOSE MEASURING METHOD AND APPARATUS WITH NUCLIDE DISCRIMINATION FUNCTION

[75] Inventors: Kiyoshi Koike; Hiroshi Tsuchiya; Tsuyoshi Hayakawa, all of Shizuoka, Japan

[73] Assignee: Hamamatsu Photonics Kabushiki Kaisha, Shizuoka, Japan

[21] Appl. No.: 159,752

[22] Filed: Feb. 24, 1988

[30] Foreign Application Priority Data

Oct. 9, 1987 [JP] Japan .................. 62-255731

[51] Int. Cl.$^4$ .................................. G01T 1/20
[52] U.S. Cl. .................. 250/369; 250/252.1
[58] Field of Search ............... 250/252.1, 369

[56] References Cited

U.S. PATENT DOCUMENTS

| | | |
|---|---|---|
| 3,188,468 | 9/1965 | Packard . |
| 3,829,686 | 5/1974 | Schultz et al. . |
| 3,976,878 | 7/1976 | Chevalier et al. . |
| 4,217,497 | 8/1980 | Daniels et al. .......... 250/369 |
| 4,322,617 | 3/1982 | Parker . |
| 4,546,252 | 10/1985 | Dion . |
| 4,550,381 | 10/1985 | Waechter et al. .......... 250/369 |
| 4,580,048 | 4/1986 | Dion . |

FOREIGN PATENT DOCUMENTS 8607677 8/1986 United Kingdom .

OTHER PUBLICATIONS

European Search Report.

*Primary Examiner*—Janice A. Howell
*Assistant Examiner*—Tuan Nguyen
*Attorney, Agent, or Firm*—Finnegan, Henderson, Farabow, Garrett, & Dunner

[57] ABSTRACT

A method and portable apparatus for measuring radiation dose and identifying a source radionuclide. Energy correction to calibrate detected charge to γ-ray energy level is made through the use of naturally occurring radiation from 40K in a potassium compound KCl. One embodiment includes a portable scintillator and photomultiplier (PMT) along with an accumulation memory, an input means, a signal processing circuit, a memory and an output means. A warning function informs of an abnormality when the difference between the measured radiation data and the standard data in the device memory exceeds a predetermined value.

19 Claims, 2 Drawing Sheets

RADIATION DOSE MEASURING METHOD AND APPARATUS WITH NUCLIDE DISCRIMINATION FUNCTION

BACKGROUND OF THE INVENTION

The present invention relates to a method and a portable apparatus for measuring a radiation dose, and in particular relates to identifying the radionuclide source of the radiation.

Conventional radiation dose measuring devices include Geiger Mueller (GM) tube devices, which utilize gas amplification of ion pairs generated along a locus of radiation to produce an electric pulse, and scintillation type devices, which utilize photomultiplier tubes which react to photons generated by radiation incident upon a scintillation screen to produce an electric pulse. Photomultipliers perform multi-step amplification of photoelectrons emitted from a photocathode by making the photoelectrons cascade through secondary emission electrodes.

In measuring and accurately determining the various peaks in a γ-ray spectrum or in identifying a radionuclide by using a radiation detecting device, it is necessary to calibrate the pulse amplitude scale to the absolute energy of the γ-ray. Because conventional correction methods utilize a radiation source, the above-described measurements may not be done in places where radiation sources are prohibited or restricted. There is an increasing need to measure radiation doses and identify the radiation source nuclides in water, air, rainwater, soil, agricultural products, marine products, and other industrial and environmental areas, especially as a result of recent radioactive pollution in some countries resulting from nuclear power plant accidents. In some situations such measurements are not readily performed because the use of radiation sources in residential areas is restricted, and usually it is difficult to obtain a radiation source even when the use is permitted.

SUMMARY OF THE INVENTION

It is an object of the present invention to provide a highly portable method and apparatus for measuring radiation doses and identifying radionuclides emitting the radiation.

To achieved the foregoing object, and in accordance with the purposes of the invention as embodied and broadly described herein, a portable radiation measurement apparatus is provided comprising: first memory means for storing nuclear radiation decay energy spectra of a plurality of selected radionuclides; detecting means, responsive to independent absorptions of nuclear radiation, for generating electrical pulses having a charge magnitude proportional to the energy of the nuclear radiation and the number of said pulses being proportional to the number of the independent radiation absorptions; conversion means, having a predetermined resolution, for digitizing the charge magnitude of the pulses; second memory means for accumulating a charge magnitude distribution of the number of said independent radiation absorptions having similar digital values; a central processing unit operative to convert said charge magnitude distribution into a nuclear radiation energy level distribution, and to compare said nuclear radiation energy level distribution to the stored nuclear radiation decay energy spectra to identify the radionuclide emitting said nuclear radiation.

To further achieve these objects, and in accordance with another aspect of the invention, a radiation measurement method is provided comprising: storing nuclear radiation decay energy spectra of a plurality of selected radionuclides; detecting nuclear radiation incident to a nuclear radiation detector; generating electrical pulses in response to independent absorptions of the incident nuclear radiation, the pulses having a charge magnitude proportional to the energy of the incident nuclear radiation and the number of the pulses being proportional to the number of the independent radiation absorptions; digitizing, according to a predetermined resolution, the charge magnitude of the pulses; accumulating a charge magnitude distribution of the number of the independent radiation absorptions having similar digital values; converting the charge magnitude distribution into a nuclear radiation energy level distribution; and comparing the nuclear radiation energy level distribution to the stored nuclear radiation energy decay spectra to identify the radionuclide emitting the incident nuclear radiation.

The present invention provides for highly portable measurement of radiation dose by correcting the detected radiation energy through the use of radiation from a radioisotope naturally occurring in a selected element. Because of the portable construction of the input device and signal processing means, one can readily obtain a corrected energy spectrum, a radiation dose rate measurement and also identify the source radionuclide and its quantity. Moreover, a warning device signals a malfunction when the difference between the measured data and a standard energy spectrum or radiation dose rate data exceeds a predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in and constitute part of the specification, illustrate a preferred embodiment of the invention, and together with the summary of the invention given above and the detailed description of the preferred embodiment given below, serve to explain the principles of the invention.

FIG. 5 is a radiation dose measuring apparatus with a nuclide discrimination function which is an embodiment of the present invention.

DETAILED DESCRIPTION OF THE PREFERRED EMBODIMENT

Figure 1:
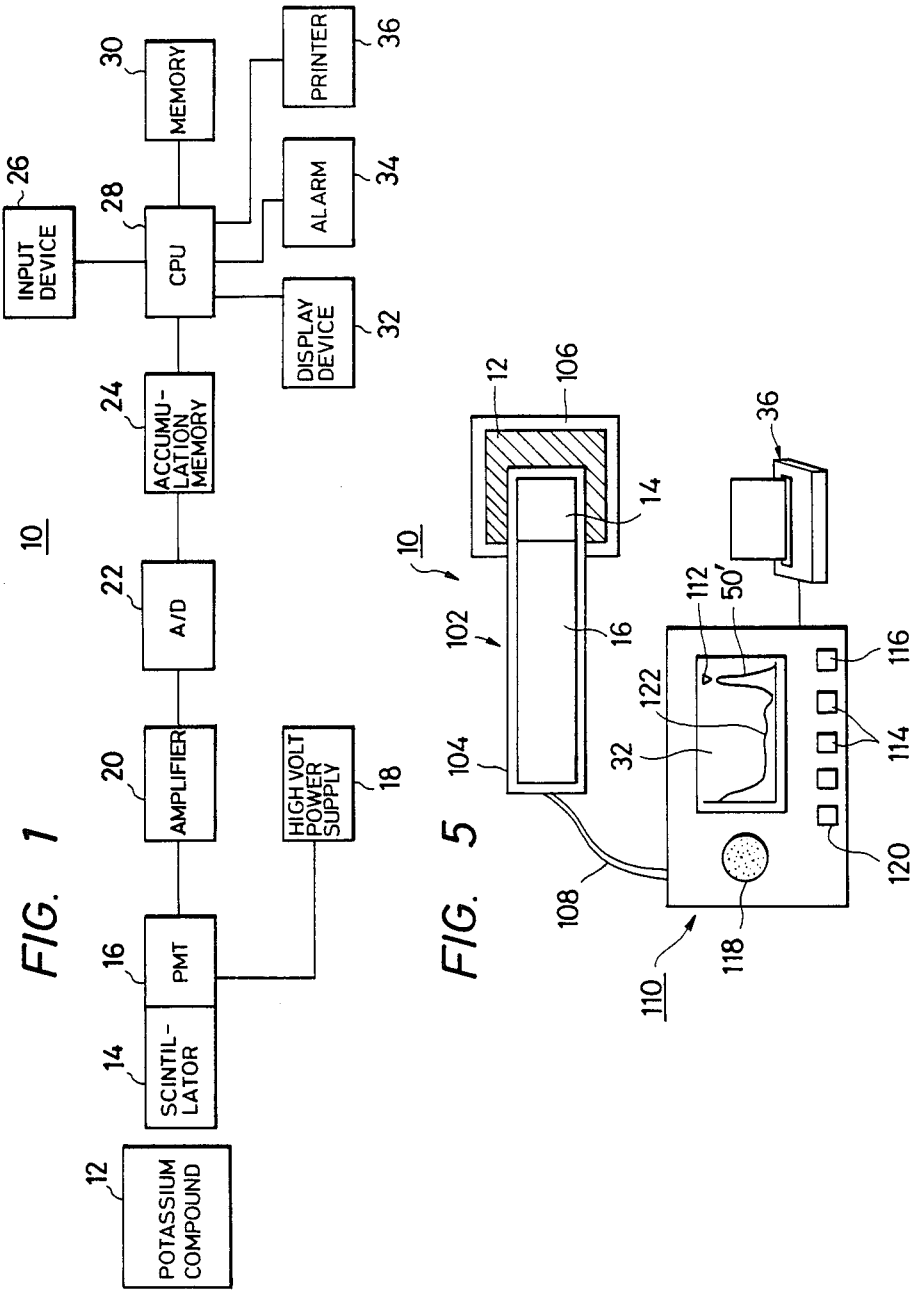
FIG. 1 is a block diagram of radiation measurement system incorporating the teachings of the present invention.

Reference will now be made in detail to the present preferred embodiment as illustrated in the accompanying drawings wherein like reference numerals refer to like parts.

An overall block diagram of radiation measurement system 10 is shown in FIG. 1 and comprises potassium compound 12, scintillator 14, photomultiplier (PMT) 16, high-voltage supply 18, amplifier 20, A/D (analog to digital) converter 22, accumulation memory 24, input device 26, signal processing circuit (CPU) 28, memory 30, display device 32, alarm 34, and printer 36.

Scintillator 14 receives incident radiation from sources, for example, such as potassium compound 12 which contains naturally a radionuclide $40_K$ with a decay mode of γ-emission and provides a photon input to photomultiplier 16. High-voltage power supply 18 is a portable high-voltage source for PMT 16. Amplifier 20 is coupled to PMT 16, and A/D converter 22 is coupled to amplifier 20. Accumulation memory 24 is coupled to A/D converter 22. Signal processing unit, CPU 28, receives data input from accumulation memory 24, and instructions from input device 26. CPU 28 stores the data in memory 30, displays information on display device 32, warns of abnormal conditions on alarm device 34, and prints data output on printer 36.

Figure 2:
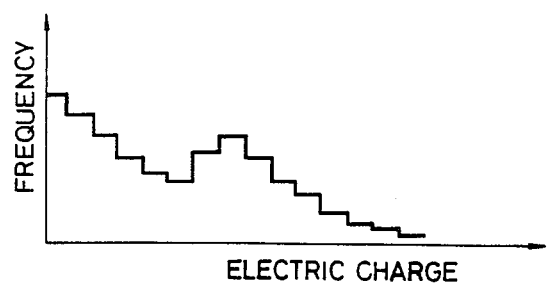
FIG. 2 is a graph of typical electric charge data in an accumulation memory.

Portable radiation measurement apparatus 10 is shown in FIG. 1. This measurement apparatus includes a detecting means for generating electrical pulses. As embodied herein, this detecting means includes scintillator 14 and PMT 16. Scintillator 14 produces a photon output to PMT 16 in response to incident γ-rays emitted by radionuclides such as potassium compound 12. PMT 16 generates an electrical pulse in response to the photons from scintillator 14 which has an electric charge proportional to the energy of the γ-ray stimulating the photon response from scintillator 14. High-voltage supply 18 is preferably a battery. The output pulse from PMT 16 is in turn amplified by the amplifier 20 and is converted to digital form by A/D converter 22. The resolution of A/D converter 22 is such that small ranges of electrical charge values will be assigned discrete digital values. A pulse frequency corresponding to the number of output pulses at each of a plurality of energy levels corresponding to the electrical charge of the output pulse is accumulated as a charge magnitude distribution in accumulation memory 24. Data from each channel corresponding to each energy level in accumulation memory 24 can be shown as a graph of frequency vs. electric charge as shown in FIG. 2. If the output from the scintillator-PMT corresponds to the energy level of the γ-rays incident upon scintillator 14, then the electric charge data of each channel in accumulation memory 24 represents the γ-ray energy level distribution.

A schematic representation of radiation measurement system 10 is shown in FIG. 5. Probe 102 comprises scintillator 14 and PMT 16 in aluminum case 104. Potassium compound 12, KCl in the preferred embodiment, is contained in a γ-ray attenuating housing 106 preferably constructed of a heavy metal such as lead. The end of probe 102 containing scintillator 14 is inserted into housing 106. Probe 102 is connected by cable 108 to housing 110 which contains high-voltage power supply 18, amplifier 20, A/D converter 22, accumulation memory 24, CPU 28, input device 26, memory 30, display device 32, and alarm 34.

Mounted on housing 110 is display device 32, which in the preferred embodiment is a liquid crystal display panel. Display device 32 in FIG. 5 shows an energy spectrum curve 122 with a characteristic peak 50' resulting from $40_K$ decay and a cursor 112. Cursor 112 is capable of being manipulated by cursor control keys 114.

The detection efficiency of the scintillator-PMT does not change with temperature variation and lapse of time, but the conversion sensitivity of γ-ray energy into electric charge does vary with time and temperature. Therefore, correction for the conversion sensitivity of the scintillator-PMT is necessary.

Figure 3:
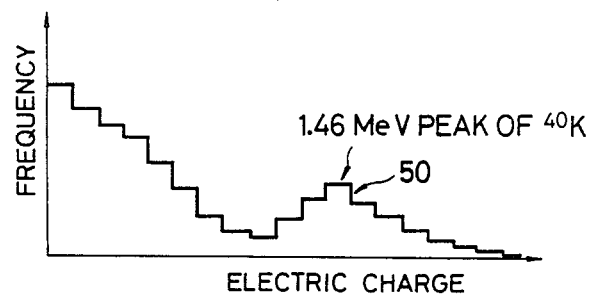
FIG. 3 is a graph of electric charge data in an accumulation memory when γ-ray generated by the $40_K$ radioisotope is detected.

In the preferred embodiment of the invention, potassium compound 12 may be, for example, several tens of grams of KCl. Radioactive $40_K$ is a naturally occurring isotope comprising approximately 0.01% of natural potassium. γ-rays emitted by the decay of $40_K$ have an energy of 1.4608 MeV. These γ-rays, when detected by scintillator-PMT 16, generate a peak 50 at 1.4608 MeV in accumulation memory 24. Typical data in accumulation memory 24 resulting from the natural decay of potassium compound 12 is shown in FIG. 3.

In accordance with the invention, a central processing unit operative to convert the charge magnitude distribution into a nuclear radiation energy level distribution is provided. As embodied herein the correction of the scintillator-PMT electric charge output to a γ-ray energy spectrum is made by CPU 28 based on peak position 50'. The correction procedure is conducted as follows. An operator moves cursor 112 of FIG. 5 to peak position 50' of the charge distribution displayed on the display device 32 by manipulating cursor controls 114. The operator then inputs a correction signal using correction key 116. CPU 28 converts charge scale 122 into an energy scale so that the cursor position becomes the γ-ray energy peak at 1.4608 MeV radiated from the $40_K$ radioisotope of potassium compound 12.

Following completion of the correction procedure, potassium compound 12 is removed from probe 102. This removes the shielding effect of lead case 106 and permits measurement of the radiation dose rate and γ-ray energy level of a sample. CPU 28 corrects for natural background radiation, calculates the radiation dose rate and γ-ray energy levels of the source radionuclide, stores the results in memory 30, and displays the γ-ray energy spectrum and radiation dose rate on display device 32.

CPU 28 compares the γ-ray energy levels in accumulation memory 24 to characteristic γ-ray peaks of various radionuclides entered by an operator to memory 30 through input device 26 to identify the radionuclides emitting the detected γ-rays. Typically the radionuclides present in radioactive pollution include $60_{Co}$, $137_{Cs}$, $131_I$, $141_{Ce}$, $103_{Ru}$, and other radionuclides characteristic of specific types of pollution. Table 1 below shows the characteristic energy level peaks and half lives for typical radioactive contaminants. These γ-ray energy level peaks may be input through input device 26 using input key 120 of FIG. 5 for storage in memory 30 and later use by CPU 28 in identifying radionuclides.

TABLE 1

| Nuclide | λ-ray energy (Mev) | Half life |
|---|---|---|
| $60_{Co}$ | 1.17, 1.33 | 5.27 Years |

TABLE 1-continued

| Nuclide | λ-ray energy (Mev) | Half life |
| --- | --- | --- |
| $^{137}Cs$ | 0.662 | 30.0 Years |
| $^{131}I$ | 0.364 | 8.04 Days |
| $^{141}Ce$ | 0.145 | 32.5 Days |
| $^{103}Ru$ | 0.497 | 39.35 Days |

The results of the identification of the radiation source radionuclides may be displayed on display device 32 or printed out along with energy spectrum 122 on printer 36.

Figure 4:
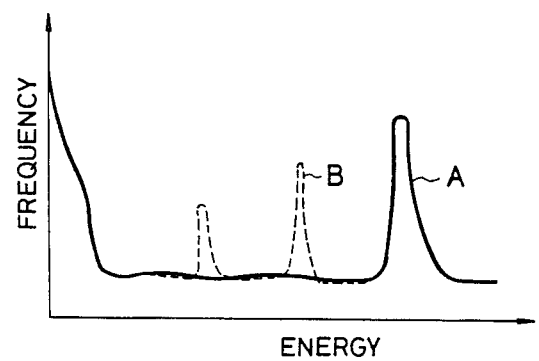
FIG. 4 is a graph of a typical radiation energy spectrum.

If the standard energy spectrum indicated by γ-ray energy level peaks for the various radionuclides entered in memory 30, indicated as "B" of FIG. 4, various from the standard spectrum, indicated as "A" of FIG. 4, by a predetermined amount, the abnormality may be signaled by CPU 28 on alarm 34.

Correction of electric charge peak 50 of FIG. 3 to an γ-ray energy level peak for $40_K$ is performed by CPU 28 as follows:

γ-ray radiation from $40_K$ has an energy level of 1.4608 MeV and a half life ($T_{\frac{1}{2}}$) of $1.28 \times 10^9$ years ($\lambda T_{\frac{1}{2}} = 1N\ 2$). The natural occurrence of the various isotopes of potassium are: $39_K$, 93.22%; $41_K$, 6.77% and $40_K$, 0.0117%. Eighty-nine point three percent of $40_K$ transforms into $40_{Ca}$ through beta decay and 10.7% of $40_K$ transforms into $40_{Ar}$ through radiating γ-rays. The number of atoms included in one gram of potassium is calculated as:

$$\text{(Avogadro's number)/(Atomic weight)} = 6.023 \times 10^{23}/39.0983$$
$$= 1.5405 \times 10^{22}.$$

Therefore, the number of γ-ray decay events per second in one gram of potassium is:

$$1.5405 \times 10^{22} \times (0.0117/100) \times (10.7/100) \times \ln 2/(1.28 \times 10^9 \times 365 \times 24 \times 60 \times 60) = 3.31 \text{ (decays/sec)}.$$

The number of γ-ray radiating decays in one gram of the potassium compound KCl per second is:

$$3.31 \times \text{(Number of molecules in 1g KCl)/(Number of atoms in 1g K)} = 1.7596 \text{ (decays/sec)}.$$

The number of γ-ray decays with an energy of 1.4608 MeV from 1 g of potassium and 1 g of KCl is 3.31 and 1.7596 per second, respectively.

As previously described, the radionuclide $40_K$ has a long half life and occurs naturally in potassium. Several grams to several tens of grams of the potassium compound may be used to perform the radiation energy level correction. As a comparison, this amount of potassium compound (e.g. KCl) used for the γ-ray energy level correction is much smaller than the amount of potassium in the human body. The human body contains 2.7 g of potassium per kg of body weight, therefore, a person weighing 60 kg contains about 160 g of potassium. The radiation emitted by the small amount of potassium compound 12 used for the 65 -ray energy level correction is roughly equivalent to that radiated from a baby. The radiation dose rate from potassium compound 12 is therefore negligible.

Because the γ-ray energy level of 1.4608 MeV radiated from $40_K$ is located at the upper limit of typical radioactive contamination energy level measurements (refer to Table 1), $40_K$ is very suitable for correcting the full energy spectrum scale. Potassium is easily obtained because its use is not restricted, adding to its desirability as an energy level correction source. Though other potassium compounds such as KOH, KBr, $KBH_4$, KF, $K_2CO_3$, $K_2O$, etc. are also usable for the energy level correction, KCl is the most suitable from the viewpoint of the safety and cost. There are other naturally occurring radiation sources including cosmic rays, $238_U$, and $232_{Th}$, to which radiation measurement system 10 is sensitive, but each has a substantial disadvantage. Cosmic ray energy levels vary with time and are not predictable over the short term. $232_{Th}$ and $238_U$ are not generally available.

In the above-described preferred embodiment of the invention, γ-ray energy level calibration data are taken over several minutes with the probe 102 fitted into housing 106 containing potassium compound 12 (KCl). The measurement result is sent to CPU 28, the 1.4608 MeV peak of $40_K$ is displayed, and the energy correction is performed as previously described. CPU 28 converts the electric charge scale into a γ-ray energy level scale so that cursor 112 position corresponds to 1.4608 MeV which is the γ-ray energy radiated from potassium compound 12. After removing potassium compound 12, the radiation from a sample is measured.

In the above-described radiation measurement procedures the energy-corrected spectrum curve is obtained and the measured radionuclide is identified through the γ-ray energy spectrum peak position. The names of the identified radionuclides may be displayed on each corresponding peak of the spectrum to facilitate recognition of the radionuclides present in the measured sample. The half lives of the identified radionuclides may also be displayed. CPU 28 compares standard γ-ray spectrum data in memory 30 to measured data in accumulation memory 24. If the measured γ-ray energy spectrum is larger than that of the standard γ-ray spectrum data by more than a predetermined amount, alarm 34 generates a warning sound. Warnings may also be printed on printer 36. A measurement place, date, time, season, weather conditions, sample name (food, water, soil, rainwater), etc., may be input to memory 30 by input device 26, and may be printed out on printer 36.

Though in the above description of an embodiment of the invention the detection means is constructed as the combination of a scintillator and PMT, it may also be constructed as the combination of the scintillator and silicon photodiode.

Moreover, though the above description is restricted to the γ-ray measurement, γ-ray measurement can also be performed by using an α-ray detector.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicants' general inventive concept.

What is claimed is:

1. A portable radiation measurement apparatus comprising:
    first memory means for storing nuclear radiation decay energy spectra of a plurality of selected radionuclides;

detection means, responsive to independent absorptions of nuclear radiation, for generating electrical pulses having a charge magnitude proportional to the energy of said nuclear radiation and the number of said pulses being proportional to the number of said independent radiation absorptions;

digitizing means, having a predetermined resolution, for digitizing the charge magnitude of said pulses;

second memory means for accumulating a charge magnitude distribution of the number of said independent radiation absorptions having similar digital values; and a central processing unit (CPU) operative to convert said charge magnitude distribution into a nuclear radiation energy level distribution, and operative to compare said nuclear radiation energy level distribution to said stored nuclear radiation decay energy spectra to identify the radionuclide emitting said nuclear radiation.

2. The apparatus of claim 1 wherein said detection means includes a scintillator and a photomultiplier tube.

3. The apparatus of claim 1 wherein said detection means includes a scintillator and a silicon photodiode detector.

4. The apparatus of claim 1 further comprising a nuclear radiation calibration source of a naturally occurring radionuclide.

5. The apparatus of claim 4 wherein said calibration source is $40_K$.

6. The apparatus of claim 4 further comprising an enclosure made of a high atomic weight metal for holding said calibration source in close proximity to said detection means and for shielding said detecting means from ambient nuclear radiation.

7. The apparatus of claim 1 wherein said CPU is further operative to correct natural background radiation in said charge magnitude distribution.

8. The apparatus of claim 1 wherein said CPU includes an alarm means for producing a warning signal at times when said stored nuclear radiation decay energy spectra differ from said nuclear radiation energy level distribution by more than a predetermined value.

9. The apparatus of claim 1 wherein said CPU includes a counting means responsive to said electrical pulses, for calculating the dose rate of said nuclear radiation.

10. The apparatus of claim 1 further comprising an output means for visually displaying said nuclear radiation energy level distribution and the identity of said radionuclide emitting said nuclear radiation.

11. A radiation measurement method comprising:

storing nuclear radiation decay energy spectra of a plurality of selected radionuclides;

detecting nuclear radiation incident to a nuclear radiation detector;

generating electrical pulses in response to independent absorption of said incident nuclear radiation, said pulses having a charge magnitude proportional to the energy of said incident nuclear radiation and the number of said pulses being proportional to the number of said independent radiation absorptions;

digitizing, according to a predetermined resolution, the charge magnitude of said pulses;

accumulating a charge magnitude distribution of the number of said independent radiation absorptions having similar digital values;

converting said charge magnitude distribution into a nuclear radiation energy level distribution; and comparing said nuclear radiation energy level distribution to said stored nuclear radiation energy decay spectra to identify the radionuclide emitting said incident nuclear radiation.

12. The method of claim 11 wherein said step of detecting said incident nuclear radiation using a scintillator and a photomultiplier tube.

13. The method of claim 11 wherein said step of detecting includes detecting said incident nuclear radiation using a scintillator and a silicon photodiode detector.

14. The method of claim 11 wherein said step of converting includes detecting nuclear radiation from a calibration source of a selected naturally occurring radionuclide.

15. The method of claim 14 wherein said step of detecting includes detecting nuclear radiation from a $40_K$ source.

16. The method of claim 11 further comprising the step of correcting a component of natural background radiation in said charge magnitude distribution.

17. The method of claim 11 wherein said step of comparing includes warning when said stored nuclear radiation decay energy spectra differ from said nuclear radiation energy level distribution by more than a predetermined value.

18. The method of claim 11 further comprising a step of counting said electrical pulses and calculating the dose rate of said incident nuclear radiation.

19. The method of claim 11 further comprising the step of displaying said nuclear radiation energy level distribution and the identity of said radionuclide emitting said incident nuclear radiation.

* * * * *